(12) United States Patent
Eberle et al.

(10) Patent No.: US 9,314,955 B2
(45) Date of Patent: *Apr. 19, 2016

(54) USE OF OPTIMIZED PISTON MEMBER FOR GENERATING PEAK LIQUID PRESSURE

(71) Applicant: DISCMA AG, Hunenberg (CH)

(72) Inventors: Theodore F. Eberle, Ann Arbor, MI (US); Luc Desoutter, Octeville sur Mer (FR)

(73) Assignee: Discma AG, Hunenberg (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/313,130

(22) Filed: Jun. 24, 2014

(65) Prior Publication Data

US 2014/0300035 A1    Oct. 9, 2014

Related U.S. Application Data

(63) Continuation-in-part of application No. 13/267,979, filed on Oct. 7, 2011, now Pat. No. 8,968,636.

(60) Provisional application No. 61/393,411, filed on Oct. 15, 2010.

(30) Foreign Application Priority Data

Jun. 24, 2013 (EP) .................................... 13305862

(51) Int. Cl.
*B29C 49/12* (2006.01)
*B29C 49/00* (2006.01)
(Continued)

(52) U.S. Cl.
CPC ............. *B29C 49/0073* (2013.01); *B29C 49/08* (2013.01); *B29C 49/10* (2013.01); *B29C 49/06* (2013.01); *B29C 49/22* (2013.01); *B29C 2049/129* (2013.01); *B29C 2049/1219* (2013.01);
(Continued)

(58) Field of Classification Search
None
See application file for complete search history.

(56) References Cited

U.S. PATENT DOCUMENTS 3,267,185 A    8/1966 Freeman, Jr.
3,268,635 A    8/1966 Kraus et al.
(Continued)

FOREIGN PATENT DOCUMENTS

EP    0849514    6/1998
EP    1529620    5/2005
(Continued)

OTHER PUBLICATIONS

International Search Report and Written Opinion dated Apr. 17, 2012 in corresponding International Patent Application No. PCT/US2011/051284 (nine pages).
(Continued)

*Primary Examiner* — Monica Huson
(74) *Attorney, Agent, or Firm* — Eric J. Sosenko; Jonathan P. O'Brien; Honigman Miller Schwartz and Cohn LLP

(57) ABSTRACT

Use of optimized piston member for generating peak liquid pressure. A one-step hydraulic blow molding system and method for forming a preform and a liquid filled container from the preform. The machine and method include a sealing mechanism that forms a seal primarily utilizing compressive forces in an axial direction to prevent the leakage of liquid blow medium. The sealing mechanism includes an axial end face of a forming head and an upper axial surface of a neck ring.

21 Claims, 10 Drawing Sheets

(51) Int. Cl.
*B29C 49/08* (2006.01)
*B29C 49/10* (2006.01)
 B29K 101/12 (2006.01)
 B29L 31/00 (2006.01)
 B29K 23/00 (2006.01)
 B29K 67/00 (2006.01)
 B29C 49/06 (2006.01)
 B29C 49/22 (2006.01)

(52) U.S. Cl.
CPC ..... *B29C 2049/1238* (2013.01); *B29K 2023/06* (2013.01); *B29K 2023/12* (2013.01); *B29K 2067/003* (2013.01); *B29K 2101/12* (2013.01); *B29L 2031/712* (2013.01)

(56) References Cited

U.S. PATENT DOCUMENTS

| | | | |
|---|---|---|---|
| 3,993,427 A | 11/1976 | Kauffman et al. | |
| 4,039,641 A | 8/1977 | Collins | |
| 4,177,239 A | 12/1979 | Gittner et al. | |
| 4,321,938 A | 3/1982 | Siller | |
| 4,432,720 A | 2/1984 | Wiatt et al. | |
| 4,457,688 A | 7/1984 | Calvert et al. | |
| 4,490,327 A | 12/1984 | Calvert et al. | |
| 4,499,045 A | 2/1985 | Obsomer | |
| 4,539,172 A | 9/1985 | Winchell et al. | |
| 4,615,667 A | 10/1986 | Roy | |
| 4,725,464 A | 2/1988 | Collette | |
| 4,883,631 A | 11/1989 | Ajmera | |
| 4,935,190 A | 6/1990 | Tennerstedt | |
| 5,129,815 A | 7/1992 | Miyazawa et al. | |
| 5,269,672 A | 12/1993 | DiGangi, Jr. | |
| 5,389,332 A | 2/1995 | Amari et al. | |
| 5,403,538 A | 4/1995 | Maeda | |
| 5,540,879 A | 7/1996 | Orimoto et al. | |
| 5,599,496 A | 2/1997 | Krishnakumar et al. | |
| 5,611,987 A | 3/1997 | Kato et al. | |
| 5,622,735 A | 4/1997 | Krishnakumar et al. | |
| 5,635,226 A | 6/1997 | Koda et al. | |
| 5,681,520 A | 10/1997 | Koda et al. | |
| 5,687,550 A | 11/1997 | Hansen et al. | |
| 5,824,237 A | 10/1998 | Stumpf et al. | |
| 5,962,039 A | 10/1999 | Katou et al. | |
| 6,214,282 B1 * | 4/2001 | Katou et al. | 264/524 |
| 6,277,321 B1 | 8/2001 | Vailliencourt et al. | |
| 6,485,670 B1 | 11/2002 | Boyd et al. | |
| 6,502,369 B1 | 1/2003 | Andison et al. | |
| 6,692,684 B1 | 2/2004 | Nantin et al. | |
| 6,729,868 B1 | 5/2004 | Vogel et al. | |
| 6,749,415 B2 | 6/2004 | Boyd et al. | |
| 6,767,197 B2 | 7/2004 | Boyd et al. | |
| 7,141,190 B2 | 11/2006 | Hekal | |
| 7,314,360 B2 | 1/2008 | Koda et al. | |
| 7,473,388 B2 | 1/2009 | Desanaux et al. | |
| 7,553,441 B2 | 6/2009 | Shi | |
| 7,914,726 B2 | 3/2011 | Andison et al. | |
| 7,981,356 B2 * | 7/2011 | Warner et al. | 264/528 |
| 8,017,064 B2 * | 9/2011 | Andison et al. | 264/524 |
| 8,096,483 B2 | 1/2012 | Riney | |
| 8,714,963 B2 * | 5/2014 | Andison et al. | 425/524 |
| 8,828,308 B2 * | 9/2014 | Maki et al. | 264/532 |
| 8,968,636 B2 * | 3/2015 | Eberle | 264/532 |
| 2001/0010145 A1 | 8/2001 | Tawa et al. | |
| 2005/0067002 A1 | 3/2005 | Jones | |
| 2005/0140036 A1 | 6/2005 | Hirota et al. | |
| 2005/0206045 A1 * | 9/2005 | Desanaux et al. | 264/535 |
| 2006/0097417 A1 | 5/2006 | Emmer | |
| 2006/0231646 A1 | 10/2006 | Geary, Jr. | |
| 2008/0029928 A1 * | 2/2008 | Andison et al. | 264/238 |
| 2008/0254160 A1 | 10/2008 | Rousseau et al. | |
| 2008/0271812 A1 | 11/2008 | Stefanello et al. | |
| 2010/0084493 A1 | 4/2010 | Troudt | |
| 2010/0213629 A1 | 8/2010 | Adriansens | |
| 2010/0303946 A1 | 12/2010 | Voth | |
| 2011/0265433 A1 | 11/2011 | Chauvin et al. | |
| 2012/0061885 A1 | 3/2012 | Maki et al. | |

FOREIGN PATENT DOCUMENTS

| | | |
|---|---|---|
| EP | 1577258 | 9/2005 |
| EP | 1688234 | 8/2006 |
| FR | 2887525 | 12/2006 |
| JP | 57-123027 | 7/1982 |
| JP | 63-249616 | 10/1988 |
| JP | 08-039656 | 2/1996 |
| JP | 09-057834 | 3/1997 |
| JP | 09-099477 | 4/1997 |
| JP | 09-272147 | 10/1997 |
| JP | 10-071641 | 3/1998 |
| JP | 10-217258 | 8/1998 |
| JP | 2000-043129 | 2/2000 |
| JP | 2004-122457 | 4/2004 |
| JP | 2005-254704 | 9/2005 |
| JP | 2005-529002 | 9/2005 |
| JP | 2007-290772 | 11/2007 |
| KR | 100147442 | 8/1998 |
| KR | 2006-0105883 | 10/2006 |
| KR | 10-2006-0128062 | 12/2006 |
| WO | WO-02/24435 | 3/2002 |
| WO | WO-03/095179 | 11/2003 |
| WO | WO-2004/065105 | 8/2004 |
| WO | WO-2005/044540 | 5/2005 |
| WO | WO-2007/120807 | 10/2007 |

OTHER PUBLICATIONS

International Search Report and Written Opinion dated May 8, 2012 in corresponding International Patent Application No. PCT/US2011/054584 (six pages).

International Search Report and Written Opinion dated May 9, 2012 in corresponding International Patent Application No. PCT/US2011/056053 (six pages).

International Search Report and Written Opinion dated May 30, 2012 in corresponding International Patent Application No. PCT/US2011/056057 (six pages).

International Search Report and Written Opinion dated Jun. 15, 2012 in corresponding International Patent Application No. PCT/US2011/051293 (eight pages).

International Search Report and Written Opinion dated Sep. 28, 2012 in corresponding International Patent Application No. PCT/US2012/024954 (six pages).

International Search Report and Written Opinion dated Oct. 29, 2012 in corresponding International Patent Application No. PCT/US2012/024950 (seven pages).

International Search Report and Written Opinion dated Apr. 18, 2012 in corresponding International Patent Application No. PCT/US2011/051289 (nine pages).

* cited by examiner

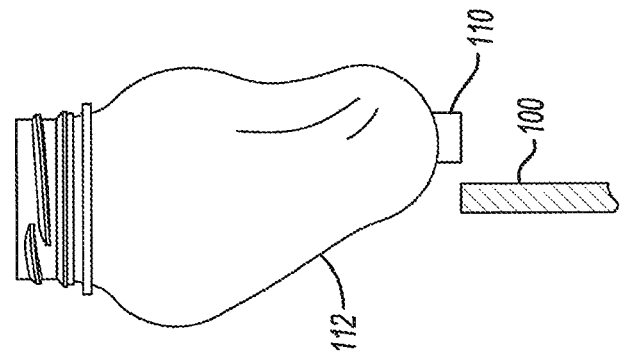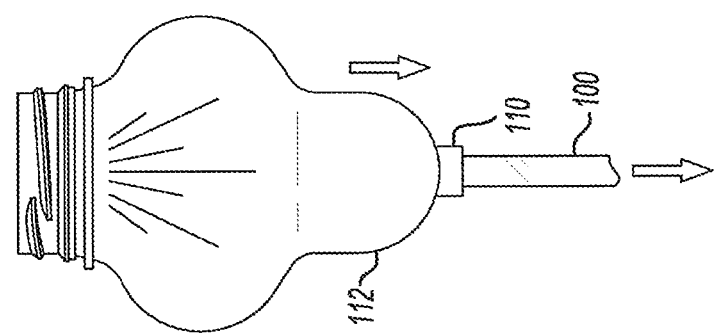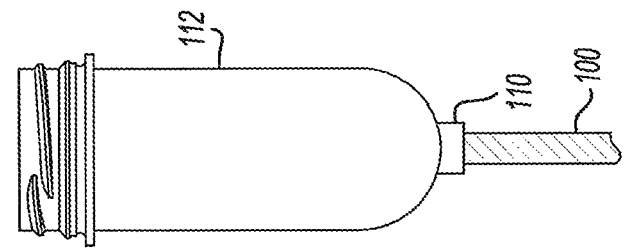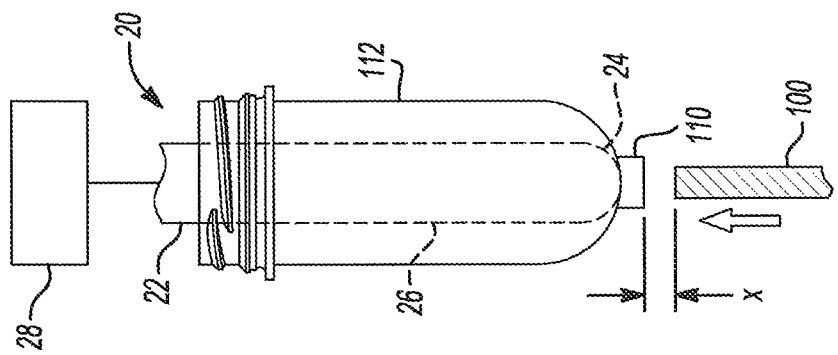

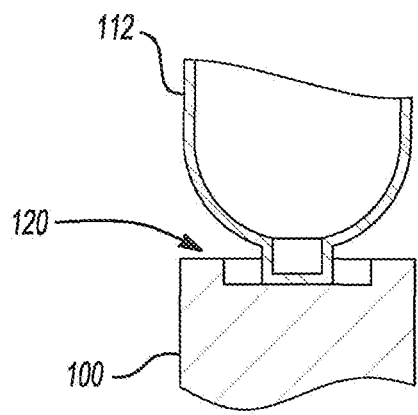
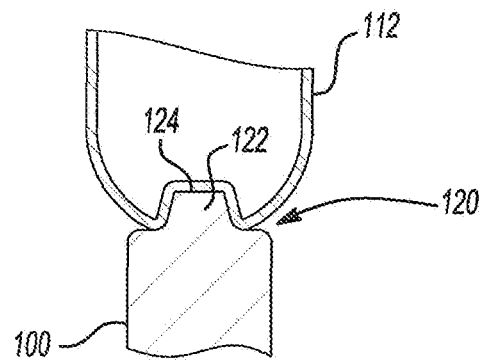
Fig-2A   Fig-2B
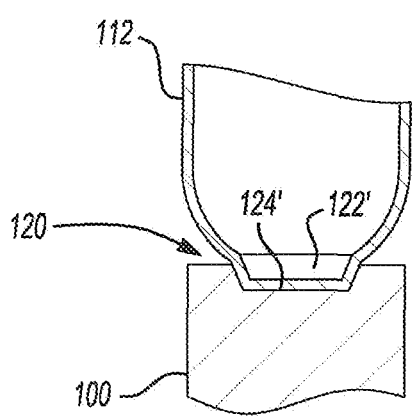
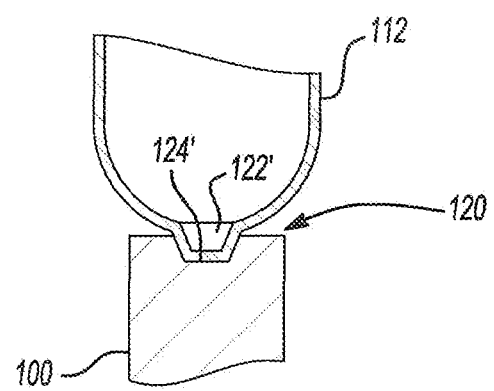
Fig-2C   Fig-2D

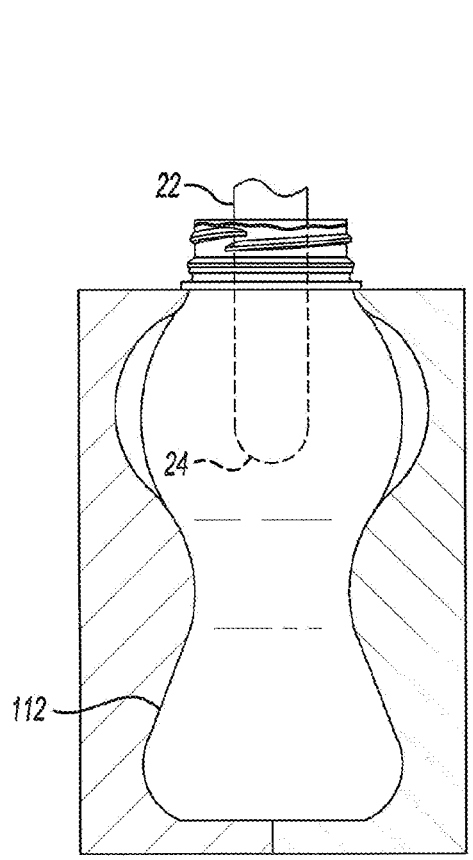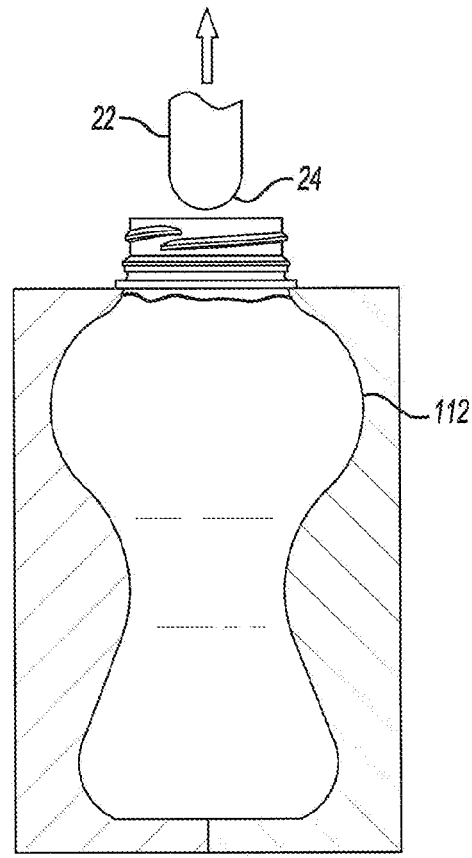
Fig-3A          Fig-3B
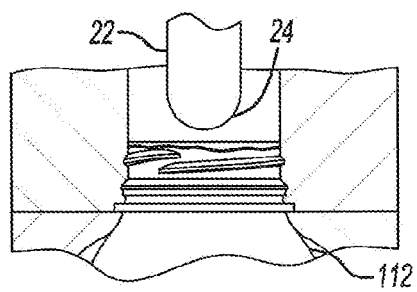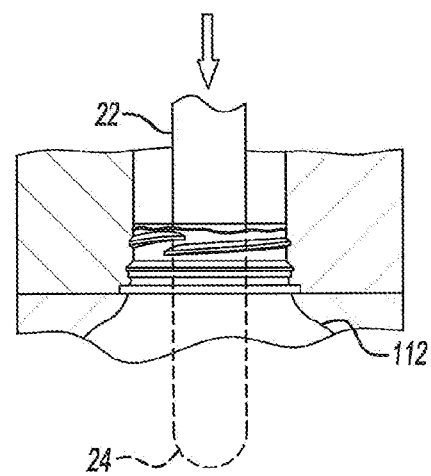
Fig-4A          Fig-4B

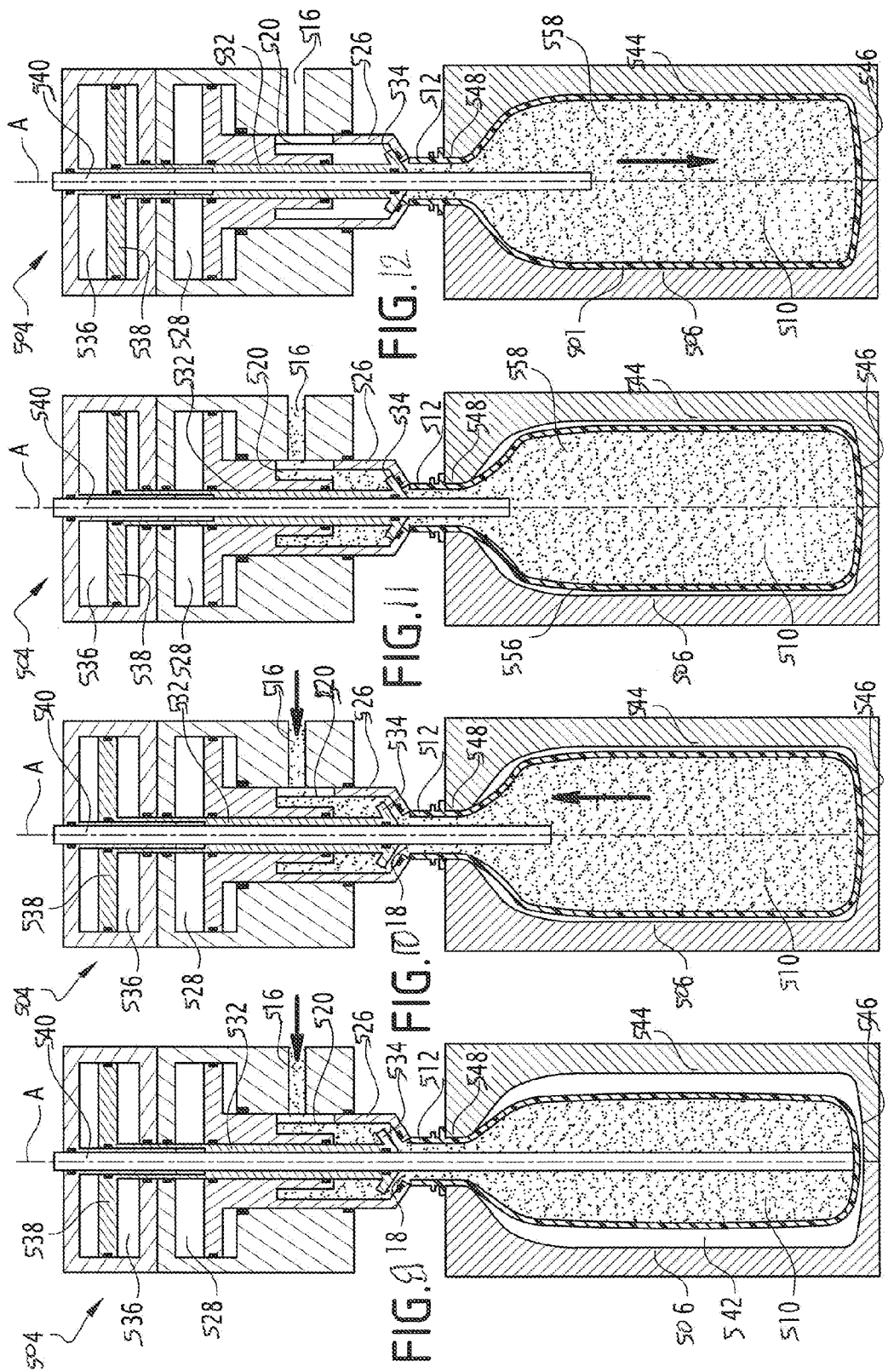

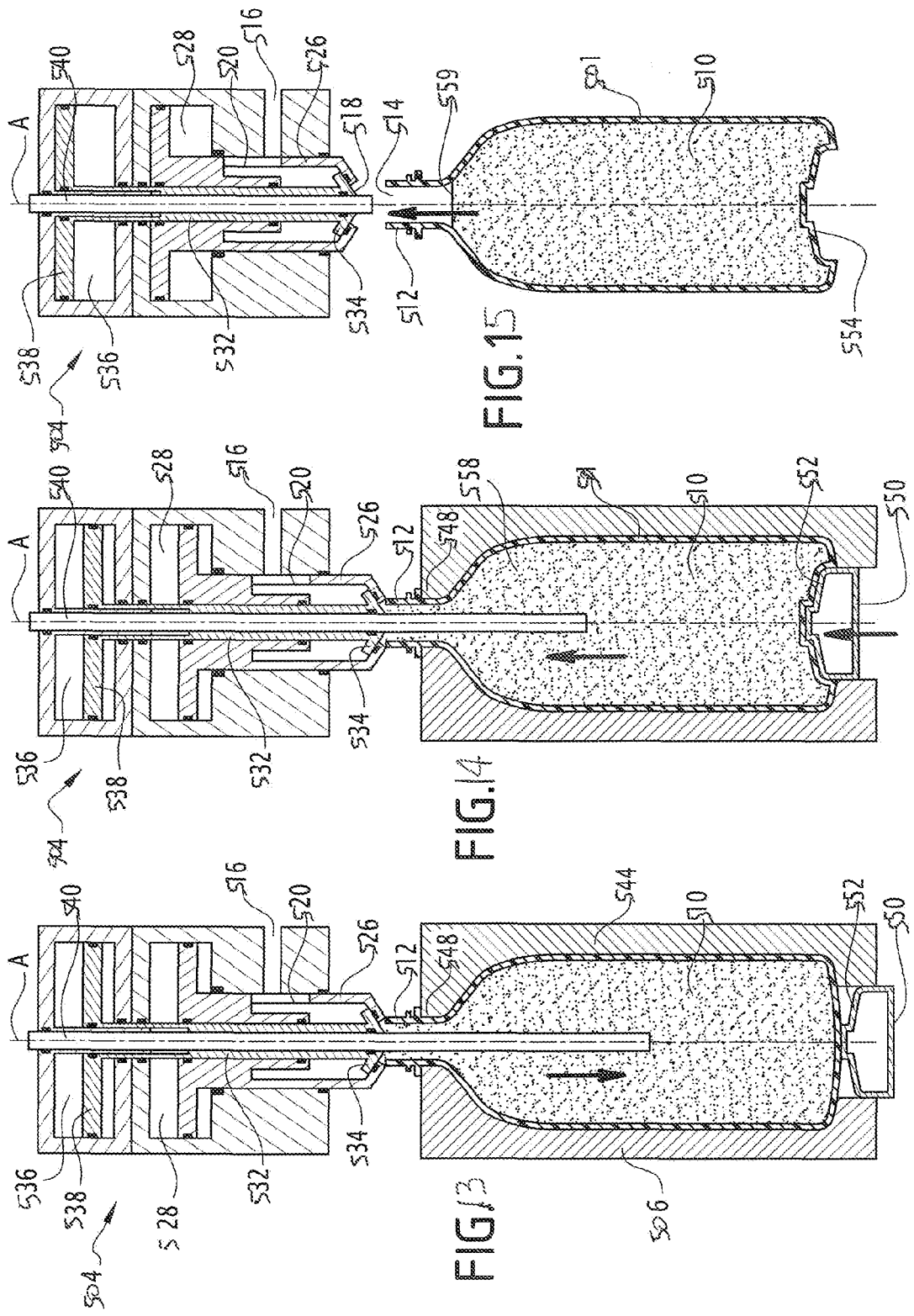

USE OF OPTIMIZED PISTON MEMBER FOR GENERATING PEAK LIQUID PRESSURE

CROSS-REFERENCE TO RELATED APPLICATIONS

This application is a continuation-in-part of U.S. patent application Ser. No. 13/267,979, filed on Oct. 7, 2011, now U.S. Pat. No. 8,968,636, which claims the benefit of U.S. Provisional Application No. 61/393,411, filed on Oct. 15, 2010. This application further claims the benefit and priority of the European Application No. EP13 305862, filed on Jun. 24, 2013. The entire disclosures of each of the above applications are incorporated herein by reference.

FIELD

The present invention generally relates to a hydraulic blow system employing a one-step container molding process wherein a preform is initially formed in a machine and a container is subsequently molded in the same machine or at a different machine while utilizing the latent heat, from the initial forming of the preform, in the subsequent forming of the container. More specifically, the invention relates to sealing of the forming head with the preform during the hydraulic blow molding process used to form the container.

In the application, "liquid" has a physical meaning. It designates any incompressible and able to flow medium. The liquid can have a low viscosity (like water or alcohol), a medium viscosity (like eatable oil or soup), or a high viscosity (like yoghurt or creamy product). The liquid can be homogeneous or not homogeneous (including fruit pulp or bits of foodstuff). It is not limited to foodstuff. The incompressible liquid may be for example water, or other beverages, body care products, home and garden care products, medical fluids, fuels, operating fluids, and the like.

BACKGROUND

In the field of hydro forming, it is known to inject the incompressible liquid in a heated preform made of plastic material at a pressure which is adapted to urge the wall of the preform against the wall of the molding cavity such that the preform is deformed and acquires the shape of the molding cavity and of the container to be produced.

However, it is also known that this pressure level is not sufficient to completely shape the preform into the container, meaning that, with the pressure applied to the preform, the preform acquires a shape which is not exactly the shape of the molding cavity and that an extra deformation is needed to completely urge the wall of the preform against the wall of the molding cavity. It is in particular the case when embossed letters or logos must be reproduced on the external surface of the container wall, or when the wall has ridges. Shapes having locally a very small radius of curvature are very difficult to obtain.

To this end, after the injection of liquid at a first pressure, a second pressure greater than the first pressure, is applied to the preform during a short time in order to create a pressure peak inside the preform, the pressure peak being arranged to finalize the shaping of the preform into a the container.

Several solutions have been proposed to apply the second pressure to the preform. FR-2 978 371 has disclosed an injection device comprising compression means between the liquid source and the outlet of the injection device. The compression means are arranged to temporarily increase the pressure of the liquid injected through the outlet of the injection. Consequently, when the compression means are not used, the liquid is injected at a first pressure and when the compression means are actuated, the pressure of the liquid is increased to provide the pressure peak needed to finish the forming of the container. A drawback of such a liquid forming method is that it needs two sealing mechanisms with their actuators, one between the compression means and the liquid pump and the other between the feeding duct and the preform neck.

US-2011/0135778 also discloses applying the pressure peak by temporarily varying the pressure of the liquid injected in the container. In this injection device, a stretch rod arranged to assist in the axial expansion of the container comprises an air vent placing the inner volume of the preform in fluidic communication with the atmosphere. Such an injection device does not allow precisely controlling the pressure inside the preform during its deformation since there is a pressure loss in the air vent of the stretch rod.

US-2013/0122136 discloses a device for injecting air and liquid into an neck of the container in order to form said container. Liquid is supplied by a pipe 30. A sealing mechanism 34 extends between the pipe 30 and the neck 20. Once the sealing mechanism closes the gap between the pipe and the neck, the container is still in fluidic connection with the liquid source through the pipe 30 and there is no movement of the pipe into the container.

According to another solution, WO-2012/037054 discloses a method wherein a liquid in injected at a first pressure in a preform placed in a molding cavity having a first volume. When the pressure peak is to be applied, the volume of the molding cavity is reduced by moving a part of the mold in order to increase the pressure applied to the preform. These solutions are satisfactory but require a modification of the injection device and/or of the mold and of the mold holder in order to carry out the step of increasing the pressure from the first pressure to the second pressure. The machine for producing containers is therefore made more complex and implementing these solutions on existing machines or providing a new machine is expensive and time consuming.

One of the aims of the invention is to overcome these drawbacks by proposing a method for producing containers wherein the second pressure can be applied and controlled in a simpler manner.

SUMMARY

This section provides a general summary of the disclosure, and is not a comprehensive disclosure of its full scope or all of its features.

The invention relates to a method of forming a plastic container from a preform, said method comprising: heating a preform; inserting said preform within a mold cavity; introducing a pressurized liquid into said preform to expand said preform to closely conform to said mold cavity; and actuating a stretch initiation rod system to engage an interior portion of said preform and actuating said stretch initiation rod system following at least a portion of said introducing said pressurized liquid to create a pressure spike within the container.

According to another embodiment, the invention relates to a method for producing a container filled with a liquid from a preform having an inner volume, the method using an injection device comprising an outlet and connected to a source of the liquid, the method comprising the steps of: placing the outlet in tight fluidic communication with the preform; injecting the liquid from the source in the inner volume of the preform through the outlet; closing a sealing barrier between the inner volume and the liquid source, the closed sealing barrier forming a fluid tight closed volume, said closed volume including at least the inner volume, said closing of the sealing barrier taking place once the closed volume is full of liquid; placing a piston member in said closed volume, and driving said piston member when the sealing barrier is closed such that the liquid pressure in the closed volume increases, wherein during the actuation of the piston member, the piston member enters at least in part inside the inner volume of the preform.

The sealing barrier of the invention delimits a closed volume, full of incompressible liquid. Consequently, by actuating the piston member, the surface of the part of the piston member in the closed volume can apply a force on the liquid inside the closed volume. That force can increase the pressure of the liquid and tend to deform the preform. The fact that the piston member enters at least in part inside the inner volume of the preform allows having said sealing barrier very close to the opening of the preform. This provides the sealing barrier with an additional function. Indeed, the sealing barrier of the invention can delimit the volume of liquid to be filled in the formed container. When the outlet is withdrawn from the preform, the quantity of liquid located outside the inner volume is limited by the sealing barrier. Therefore, by placing the sealing barrier close to the opening of the preform, the spillage of the liquid while the injection device is withdrawn can be reduced or to avoided.

In other words, the invention relates to a method for producing a container filled with a liquid from a preform having an inner volume, the method using an injection device comprising an outlet and connected to a source of the liquid, the method comprising the steps of: placing the outlet in tight fluidic communication with the preform; injecting the liquid from the source in the inner volume of the preform through the outlet; closing a rigid sealing barrier in the vicinity of the outlet of the injection device between the inner volume and the liquid source, said sealing barrier comprising a port allowing the movement in a fluid tight manner of a piston member through the sealing barrier, said rigid sealing barrier and said piston member forming a fluid tight closed volume, said closed volume including at least the inner volume, said closing of the sealing barrier taking place once the closed volume is full of liquid; increasing the pressure of the liquid in the closed volume by moving the piston member through the sealing barrier in the closed volume when the sealing barrier is closed, wherein during the actuation of the piston member, the piston member enters at least in part inside the inner volume of the preform.

Having a rigid closed sealing barrier guaranties that no pressure loss will occur during the increase in pressure by moving the piston member in the closed volume.

Advantageously, the injection device used by the method further comprises: an inlet in fluidic communication with said liquid source; a chamber extending between the inlet and the outlet; a hollow control rod comprising a sealing ring extending in the chamber, the piston member extending inside the hollow control rod; and sealing means provided between the piston member and the sealing ring to prevent liquid from flowing between the piston member and the sealing ring, wherein said closing the sealing barrier is made by moving the hollow control rod from an injecting position wherein the outlet is in fluidic communication with the inlet via the chamber to a sealing position wherein the sealing ring closes the chamber such that the sealing barrier isolates the closed volume from the rest of the chamber.

According to another feature of the method according to the invention, the piston member is a stretch rod moved inside the inner volume of the preform in order to cause a deformation of the preform. The stretch rod is indeed a rigid solid rod which can be used to increase the pressure of the liquid inside the closed volume.

This allows using the stretch rod, for example at the beginning of the forming cycle, for longitudinal expansion of the preform and using the same stretch rod as a piston member during another period of the forming cycle. This provides an even simpler forming station because the same actuator of the stretch rod can be used for both functions, longitudinal mechanical expansion first, and then liquid expansion. Consequently, there is no need of adding any element to the injection device or to the machine for forming the containers. The method can thus be used with any machine equipped with an injection device using a stretch rod to assist in the forming of the container.

Furthermore, the use of the stretch rod to control the pressure inside the molding cavity allows a fine tuning of said pressure and allows applying in a simple manner a particular pressure profile to the preform if needed.

According to another feature of the method according to the invention, the method comprises, during the injection of the liquid, the steps of: moving the stretch rod in translation along an axis A, defining an axial direction to a bottom of the preform; pushing the stretch rod to axially deform the preform; and retrieving at least a part of the stretch rod from the inner volume before the closing of the sealing barrier.

Retrieving the stretch rod puts the stretch in a position of being able to enter again in the inner volume for changing the liquid pressure and expanding the preform.

According to other features of the method according to the invention: the method further comprises placing the preform in a mold, said mold forming a mold cavity having the shape of the container to be produced, the preform placed in the mold being made of a thermoplastic material and being heated to a temperature greater than the glass transition temperature of the preform material prior to the liquid injection in the preform; the injection of the liquid is a primary deformation step, said liquid being injected at a first pressure arranged to cause a deformation of the preform towards the wall of the mold cavity and the closing of the sealing barrier takes place when said deformed preform has acquired an intermediary shape; the first pressure is applied to the liquid by injection means adapted for transferring the liquid from the liquid source to the inlet of the injection device, the sealing barrier extending between said injection means and the outlet of the injection device; the actuation of said piston member is made by increasing the volume of the piston member inside the closed volume, the other parts delimiting said closed volume being the preform itself and almost rigid parts fixed with respect to the preform; the actuation of the piston member applies a second pressure inside the inner volume, said pressure being arranged to further deform the preform from its intermediary shape to the shape of the molding cavity such that a filled and formed container is obtained.

The second pressure is applied by using the piston member, which can be the stretch rod, to increase the pressure inside the preform.

According to other features of the method according to the invention: the first pressure is applied until the intermediary shape presents a volume corresponding to between 95% and 98% of the volume of the container to be produced, the second pressure being applied such that the volume of the intermediary shape further increases by 2% to 5% in order to obtain the formed container; the method comprises a holding step during which the deformed preform shape is upheld at the shape of the mold cavity, a force applied to the piston member being controlled such that the pressure applied to the liquid in the closed volume follows a predetermined pressure profile.

According to another feature of the method according to the invention, the second pressure is applied both by moving the piston member inside the closed and filled volume of the deformed preform and by reducing the volume of the molding cavity.

According to this feature, the second pressure can be applied both by using the piston member and by reducing the volume of the molding cavity, which can increase the rate at which the second pressure can be applied and thereby increase the throughput of a machine implementing the method according to the invention.

According to other features of the method according to the invention: the mold comprises at least one main part and one bottom part, said parts defining together the molding cavity, the reducing of the volume of the molding cavity being obtained by moving the bottom part relative to the main part of the mold.

The method comprises a step of shaping at least part of the container by further reducing the volume of the molding cavity, the pressure applied to the deformed preform during this step being maintained at a constant level by retrieving a part of the piston member form the inner volume to compensate for the increase in pressure due to the reduction of the volume of the molding cavity.

As mentioned previously, the piston member can be used to apply a particular pressure profile to the preform, for example for compensating the increase of pressure due to a particular shaping step or for applying a holding pressure sometimes needed at the end of hydro forming a container.

According to other features of the method according to the invention: the first pressure is substantially between 4 and 15 bar; the second pressure is substantially between 20 and 80 bar, preferably between 25 and 45 bars, in particular about 40 bars; the pressure of the predetermined pressure profile is between 4 to 20 bars; the position of the piston member inside the formed container just before the outlet and the piston member are retrieved from the formed container is such that the volume of the liquid inside of the closed volume is equal to a volume of liquid at or below a desired level of liquid inside the produced container.

According to another aspect, the invention also relates to a station for forming and filling with liquid a container from a preform having an inner volume, the station comprising: an injection device including an outlet in fluidic communication with a liquid source; an injection device actuator arranged to connect the outlet in tight fluidic communication with the preform; injection means arranged to take liquid from the liquid source and to inject said liquid in the inner volume of the preform through the outlet; and a closable sealing barrier extending between the inner volume and the liquid source, wherein closing the sealing barrier when the injection device actuator is actuated, forms a closed volume comprising at least the inner volume; a piston member placed in the fluid tight closed volume; a control unit adapted to successively drive the injection means, close the sealing barrier when the volume to be formed is full of liquid and then drive the piston member so as to increase the liquid pressure in the closed volume; wherein during the actuation of the piston member, the piston member is at least in part inside the inner volume of the preform.

Advantageously, the injection device further comprises: an inlet in fluidic communication with said liquid source; a chamber extending between the inlet and the outlet; a hollow control rod comprising a sealing ring extending in the chamber, the piston member extending inside the hollow control rod; sealing means provided between the piston member and the sealing ring to prevent liquid from flowing between the piston member and the sealing ring; and wherein the sealing barrier comprises the sealing ring, the sealing means and the piston member such that the sealing barrier isolates the closed volume from the rest of the chamber.

Advantageously, the station further comprises injection means adapted to inject liquid coming from the liquid source through the inlet to the chamber and to inject liquid at a first pressure (P1).

In other words, the invention relates to a station for forming and filling with liquid a container from a preform having an inner volume, the station comprising: an injection device including an outlet in fluidic communication with a liquid source; an injection device actuator arranged to connect the outlet in tight fluidic communication with the preform; injection means arranged to take liquid from the liquid source and to inject said liquid in the inner volume of the preform through the outlet; a closable rigid sealing barrier extending between the inner volume and the injection means in the vicinity of the outlet, said closable rigid sealing barrier comprising a port; a piston member movable in a fluid tight manner through the port, wherein said rigid sealing barrier and said piston member form when the injection device actuator is actuated a fluid tight closed volume comprising at least the inner volume; a control unit adapted to successively drive the injection means, close the sealing barrier when the volume to be formed is full of liquid and then drive the piston member through the sealing barrier into the closed volume so as to increase the liquid pressure in the closed volume; wherein during the actuation of the piston member, the piston member is at least in part inside the inner volume of the preform.

According to other features of the station according to the invention: the piston member is formed by a stretch rod adapted to longitudinally stretch the preform or by an element distinct from the stretch rod, in which case, the station further comprises a stretch rod actuator different from the piston member actuator; the station comprises a mold having a mold cavity and a placing device adapted to place the preform in the mold cavity; the piston member is adapted to increase the pressure liquid up to a pressure level adapted to provide expansion of the preform up to the shape of the mold cavity, the piston member and the sealing barrier are arranged such that the piston member is able to move, inside the fluid tight closed volume and all over the range of the liquid pressure generated by the piston member, without breaking the sealing barrier.

In a variant, the seal between the piston member and the housing of the injection device may be attached to the injection device or to a moving part of the piston member. The piston member may slide along the seal while the volume of the piston member included into the closed volume increases. In another variant, the seal may be attached to the piston member and may slide along a surface of the injection device such as to reduce the volume of said closed volume. In both variant, the preform expands in order to keep a constant volume of the incompressible liquid inside said closed volume. Additionally, by making sure that the seal under pressure resists to the piston member, there is no leaks of liquid within said closed volume. It is possible to use said piston member to control the pressure inside the closed volume.

According to another aspect, the invention also relates to a machine for forming and filling with liquid a plurality of containers, comprising a plurality of stations as described above distributed along a closed loop carousel, the machine comprising at least one pump for providing a liquid at a predetermined pressure, said pump being in fluidic communication with each injection device of said stations.

Since the pressure can be simply controlled by the piston member, the usual piston used for injecting the liquid, which is expensive and cumbersome, can be replaced by a simple pump arranged to inject the liquid at the first pressure. The injection device can therefore be simplified and the space requirement to install the injection device and thus the station comprising the injection device and the machine comprising the stations can be reduced.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIGS. 1A-1C illustrate a series of schematic side views illustrating a central rod guiding a preform during the forming process (not to scale);

FIG. 1D illustrates a schematic side view illustrating a slipped condition of a central rod;

FIGS. 2A-2D illustrate a plurality of locating features according to the principles of the present teachings;

FIGS. 3A-3B illustrate a stretch initiation rod being withdrawn from a container to create a fluid headspace;

FIGS. 4A-4B illustrate a stretch initiation rod being inserted into a container to create a fluid pressure spike;

FIGS. 6 to 12 are diagrammatical cross-section views of an injection device and of a mold carrying a preform at various steps of the method according to another embodiment of the invention;

FIGS. 13 to 15 are diagrammatical cross-section views of the injection device and of a particular mold at various steps of the method according to a further embodiment of the invention;

Corresponding reference numerals indicate corresponding parts throughout the several views of the drawings.

DETAILED DESCRIPTION

Figure 5A:
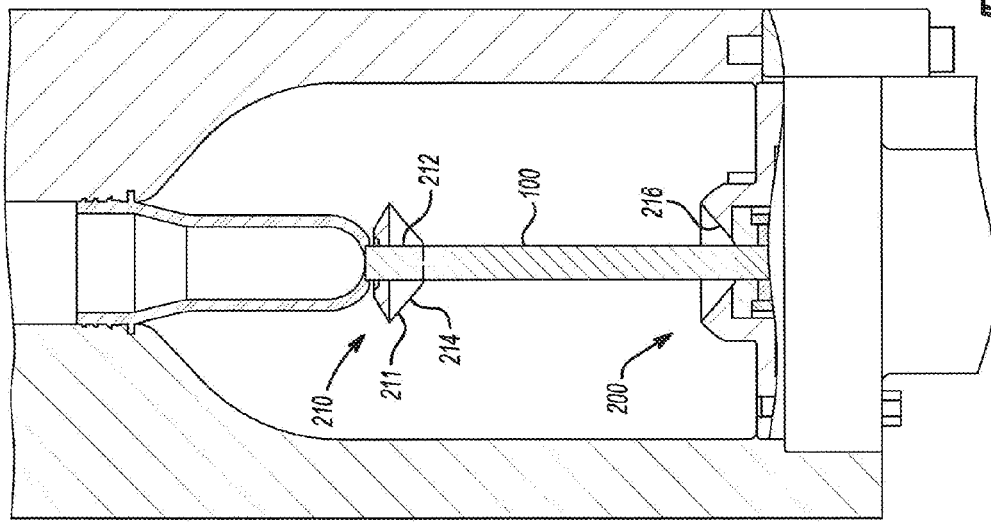
FIG. 5A illustrates a mold device having a central rod according to the present teachings.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present teachings provide a stretch blow molding machine having a centering device operable for engaging a preform container during the molding process and a stretch initiation device operable to create a stretch initiation area on the preform container. The stretch initiation device, unlike molding machines, can be used to initiate the stretching of the preform and encourage the preform to engage the centering device. The centering device of the present teachings, unlike conventional molding machines, provides improved control for maintaining the preform in a predetermined orientation to minimize contact of the stretch rod to the preform, which could result in contamination of the finished container.

As will be discussed in greater detail herein, the shape of the container described in connection with the present teachings can be any one of a number of variations. By way of non-limiting example, the container of the present disclosure can be configured to hold any one of a plurality of commodities, such as beverages, food, or other hot-fill type materials.

It should be appreciated that the size and the exact shape of the centering device are dependent on the size and shape of the container to be formed. Therefore, it should be recognized that variations can exist in the presently described designs.

The present teachings relate to the forming of one-piece plastic containers. Generally, these containers, after formation, generally define a body that includes an upper portion having a cylindrical sidewall forming a finish. Integrally formed with the finish and extending downward therefrom is a shoulder portion. The shoulder portion merges into and provides a transition between the finish and a sidewall portion. The sidewall portion extends downward from the shoulder portion to a base portion having a base. An upper transition portion, in some embodiments, may be defined at a transition between the shoulder portion and the sidewall portion. A lower transition portion, in some embodiments, may be defined at a transition between the base portion and the sidewall portion.

The exemplary container may also have a neck. The neck may have an extremely short height, that is, becoming a short extension from the finish, or an elongated height, extending between the finish and the shoulder portion. The upper portion can define an opening. Although the container is shown as a drinking container and a food container, it should be appreciated that containers having different shapes, such as sidewalls and openings, can be made according to the principles of the present teachings.

The finish of the plastic container may include a threaded region having threads, a lower sealing ridge, and a support ring. The threaded region provides a means for attachment of a similarly threaded closure or cap (not illustrated). Alternatives may include other suitable devices that engage the finish of the plastic container, such as a press-fit or snap-fit cap for example. Accordingly, the closure or cap (not illustrated) engages the finish to preferably provide a hermetical seal of the plastic container. The closure or cap (not illustrated) is preferably of a plastic or metal material conventional to the closure industry and suitable for subsequent thermal processing.

The container can be formed according to the principles of the present teachings. A preform version of the container can include a support ring, which may be used to carry or orient the preform through and at various stages of manufacture. For example, the preform may be carried by the support ring, the support ring may be used to aid in positioning the preform in a mold cavity, or the support ring may be used to carry an intermediate container once molded. At the outset, the preform may be placed into the mold cavity such that the support ring is captured at an upper end of the mold cavity.

Figure 5B:
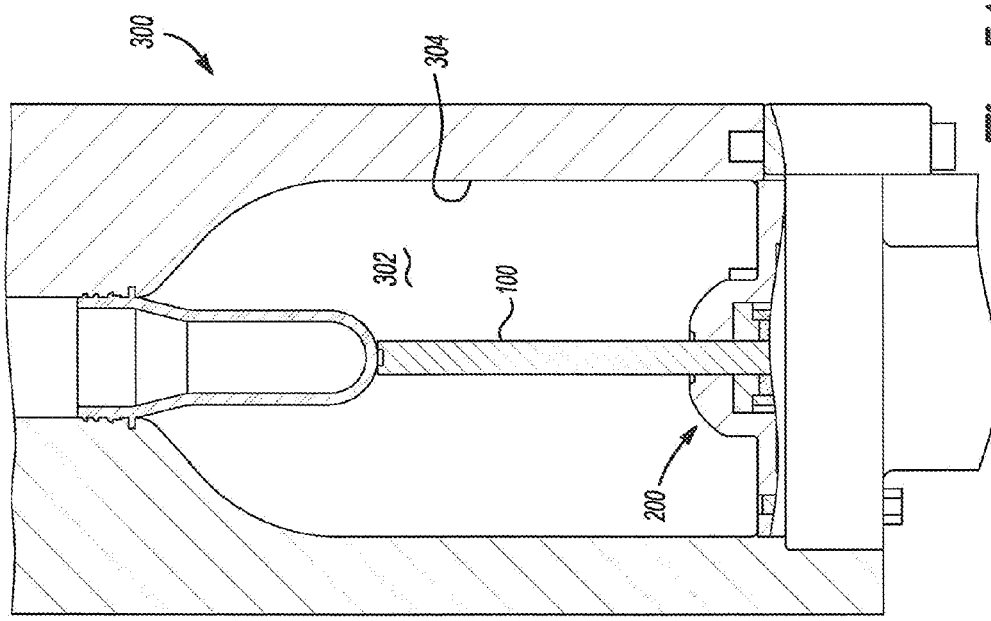
FIG. 5B illustrates a mold device having a centering feature coupled with the central rod according to the present teachings.

In general, as illustrated in FIGS. 5A and 5B, the mold 300 can comprise a mold cavity 302 having an interior surface 304 corresponding to a desired outer profile of the blown container. More specifically, the mold cavity according to the present teachings defines a body forming region, an optional moil forming region and an optional opening forming region. Once the resultant structure, hereinafter referred to as an intermediate container, has been formed in some embodiments, any moil created by the moil forming region may be severed and discarded. It should be appreciated that the use of a moil forming region and/or opening forming region are not necessarily in all forming methods or according to all embodiments of the present teachings.

In one example, a machine places the preform heated to a temperature between approximately 190° F. to 250° F. (approximately 88° C. to 121° C.) into the mold cavity. The mold cavity may be heated to a temperature between approximately 250° F. to 350° F. (approximately 121° C. to 177° C.). An internal stretch rod apparatus can stretch or extend the heated preform within the mold cavity to a length approximately that of the intermediate container thereby molecularly orienting the polyester material in an axial direction generally corresponding with the central longitudinal axis of the container. While the stretch rod extends the preform, fluid (e.g. liquid, such as the final liquid commodity; air; and the like) from a centrally disposed pressure source, having a pressure between 300 PSI to 600 PSI (2.07 MPa to 4.14 MPa), assists in extending the preform in the axial direction and in expanding the preform in a circumferential or hoop direction thereby substantially conforming the polyester material to the shape of the mold cavity and further molecularly orienting the polyester material in a direction generally perpendicular to the axial direction, thus establishing the biaxial molecular orientation of the polyester material in most of the intermediate container. The pressurized fluid holds the mostly biaxial molecularly oriented polyester material against the mold cavity for a period of approximately two (2) to five (5) seconds before removal of the intermediate container from the mold cavity. This process is known as heat setting and results in a heat-resistant container suitable for filling with a product at high temperatures.

With particular reference to FIGS. 1A-4B, stretch blow molding systems can employ a central interior stretch initiation rod system 20 that can engage an interior feature or surface of a preform 112 and/or a central exterior rod system 100 that can engage an exterior feature 110, or other portion, of the preform 112. It should be appreciated that according to the principles of the present teachings, central interior stretch initiation rod system 20 and central exterior rod system 100 can be used separately or in combination. Moreover, central interior stretch initiation rod system 20 and central exterior rod system 100 can be used independently and/or simultaneously.

With particular reference to FIGS. 1A, 3A, 3B, 4A, and 4B, in some embodiments, stretch initiation rod system 20 can be raised and lowered relative to preform 112 to provide a mechanical urging force against an interior surface of preform 112. Stretch initiation rod system 20 can comprise a rod member 22 having a distal tip 24, an elongated shaft 26, and a drive system 28 coupled to the elongated shaft 26 to actuate distal tip 24 between a retracted (see FIGS. 3B and 4A) and an extended (see FIGS. 1A, 3A, and 4B) position. Drive system 28 can comprise a pneumatic drive system, a servo drive system, or other known system for creating motion of rod member 22. In some embodiments, drive system 28 includes a servo or positive stop to provide positioning information. Moreover, in some embodiments, drive system 28 can be used for real-time tracking a position and/or drive speed of rod member 22 to provide real-time control. Still further, it should be appreciated that although rod member 22 is described and illustrated as being cylindrical with a rounded tip, other shapes and tips are envisioned, including but not limited to conical, non-uniform, tapered, pointed, flattened, and the like or can be varied to define a predetermined volume.

It should be noted, however, that stretch initiation rod system 20 can be separate from or joined with a typical central rod of a blow molding system. That is, a stretch initiation rod system 20 can be separately formed or integrally formed with the central rod. Stretch initiation rod system 20 can, however, employ distal tip 24 to engage or otherwise contact preform 112 to define the stretch initiation area and/or prestretch. By way of non-limiting example, prestretches of about 40 mm have been found to be beneficial, however other prestretch lengths, such as the distance X of FIG. 1A, may be appropriate. This insures a known stretching response and material distribution during molding, rather than the unpredictable stretching response common with conventional molding systems. This material distribution can include non-uniform distribution for predetermined design criteria.

With reference to FIGS. 1A-1D, central exterior rod system 100 can be used, ideally, to maintain preform 112 in a predetermined orientation during the stretch blow forming process as illustrated in FIGS. 1A-1C. Central interior stretch initiation rod 20 can be used, ideally, to initiate the forming process. In this way, the preform 112 is initially stretched to achieve a predetermined molding response using stretch initiation rod system 20 and then centrally maintained by central exterior rod system 100 relative to the stretch rod and/or stretch initiation rod system 20 extending therein, thereby ensuring that the stretch rod(s) does not contact the inside of the preform. Such contact of the stretch rod within the preform can cause contamination of the resultant container, thereby requiring the resultant container to be discarded or sanitized.

In some embodiments, stretch initiation rod system 20 can be used to achieve a precise headspace within the final filled container. Specifically, as seen in FIGS. 3A-3B, stretch initiation rod system 20 can be actuated and/or sized such that following formation of the preform 112 into the final container (which is done with the final fill commodity), retraction of rod member 22 can represent a precise volume (that is, the volume of rod member 22 disposed within the final fill commodity) that when retracted provides the desired headspace for packaging and shipment. Such precise headspace is achieved without complex valve systems and the like.

Moreover, in some embodiments, stretch initiation rod system 20 can be used to achieve a fluid pressure spike to aid in the shaping of preform 112 or container. Specifically, as seen in FIGS. 4A-4B, stretch initiation rod system 20 can be actuated such that the fluid volume displaced by rod member 22 is greater than a headspace within the preform 112 or finished bottle, such that insertion of rod member 22 into the preform 112 or container, having a contained and generally fixed volume, causes a pressure spike within the preform 112 or container. Such pressure spikes can be used to define final details within the preform 112 or container.

Turning now to FIG. 1D, in some embodiments, preform 112 may form in such a way as to slip off or become disengaged from the central exterior rod system 100. This can often lead to damage to the preform by contact with the central exterior rod system 100 and/or contamination with the internal stretch rod.

To overcome this issue, with reference to FIGS. 2A-2D, in some embodiments, central exterior rod system 100 can comprise a locating feature 120 for engaging or otherwise contacting the preform 112. Locating feature 120 can comprise, in some embodiments, a protruding portion 122 defining a first shape. A corresponding depression 124, having a complementary shape to the first shape, can be formed as part of preform 112. In this way, protruding portion 122 can be positively received within depression 124 to define a reliable connection therebetween. In some embodiments, protruding portion 122 is sized and shaped to closely conform to depression 124 to minimize lateral movement (that is, movement in a hoop direction). The shape of protruding portion 122, and consequently depression 124, can be cylindrical (FIGS. 2A and 2B), tapered (FIGS. 2C and 2D), wide (FIG. 2C), narrow (FIGS. 2B and 2D), or any other shape/size that provides a reliable connection between central exterior rod system 100 and preform 112. It should be appreciated that locating feature 120 can define a reverse orientation (indicated with similar primed reference numbers) to those already described in that the locating feature 120 can comprise a protruding portion extending from the preform (FIGS. 2C and 2D) for engaging a depression formed in the central exterior rod system 100.

Still further, in some embodiments as illustrated in FIGS. 5A-5B, central exterior rod system 100 can extend from mold device 200 as a generally cylindrical member (FIG. 5A) or can include a centering feature 210 located along a portion of central exterior rod system 100. In some embodiments, centering feature 210 can be an oversized head member 211 disposed on distal end 212 of central exterior rod system 100. In some embodiments, the oversized member can include a tapered portion 214, such as conical portion, that is sized to be received and/or captured within a conical depression 216 formed in the mold device 200. In this way, upon retraction of central exterior rod system 100, tapered portion 214 can be centrally received within conical depression 216 to ensure proper aligned of the now-expand preform 112 or resultant container. It should also be recognized that in some embodiments, oversized head member 211 can be shaped to form part of the mold device and, at least in part, impart a shape upon preform 112 during formation of the resultant container.

Alternatively, other manufacturing methods, such as for example, extrusion blow molding, one step injection stretch blow molding and injection blow molding, using other conventional materials including, for example, thermoplastic, high density polyethylene, polypropylene, polyethylene naphthalate (PEN), a PET/PEN blend or copolymer, and various multilayer structures may be suitable for the manufacture of plastic containers and used in connection with the principles of the present teachings.

Another embodiment of the invention is now described with reference to FIGS. 6 to 17. That embodiment relates to the technical field of forming containers 501, such as bottles, for example sterile or asepticized bottles containing water or carbonated water based drinks.

More specifically, the invention relates to a method for producing a container 501 from a preform 502 using a station comprising an injection device 504 arranged to inject an incompressible liquid in the preform 502 placed in a mold 506, the incompressible liquid being able to shape the preform 502 into the container 501 and to fill the container 501, as will be described later. Such a method is known as hydro forming and uses a hydro forming machine, which is known per se and which will not be described in detail herein, except for the parts that are needed to perform the method according to the invention.

The preform 502 comprises a hollow body 508, defining an inner volume 510, and a neck 512 comprising an opening 514, through which the inner volume 510 is accessible. A preform may have a shape similar to that of a test tube being closed at lower end and having the neck 512 with the opening 514 at the upper end. The neck 512 already has the final shape of the neck 512 of the container 501 to be produced. The preform 502, shown, by way of non-limiting example in FIG. 6, has a cylindrical body 508 extending along an axis A which coincides with the axis of the neck 512. The preform may be made from any suitable plastic materials, such as polyesters, such as polyethylene terephthalate (PET), polyethylene naphthalate (PEN), polyethylene imine (PEI), polytrimethylene terephthalate (PTT), polylactic acid (PLA), polyethylene furanoate (PEF), or polyolefins, such as polyethylene low density (LDPE) or high density (HDPE), polypropylene (PP), or styrene based materials such as polystyrene (PS), acrylonitrile butadiene styrene (ABS) or other polymers, such as polyvinyl chloride (PVC). The preforms 502 are generally produced according to an injection molding process and molded at a site different from the site where the machine for forming containers 501 is located.

Alternatively, the preform could include some metal, in particular the preform could be made of a metallic alloy, such as a steel or aluminium alloy. For example, the preform could be the major part of a can on which a lid is crimped. The liquid forming process according to the invention could be used to provide shape details on the can wall together with filling the can before crimping the lid.

The incompressible liquid injected in the preform by the injection device 504 is for example the liquid which is intended to fill the container 501, when the container 501 is used by an end user.

In reference to FIG. 6, the injection device 504 for injecting the incompressible liquid in the preform 502 will be described. The injection device 504 described herein and shown in the figures is an example of an injection device that can be used for hydro forming methods and it is to be understood that the method according to the invention can be used with any other kind of injection devices.

The injection device 504 comprises an inlet 516, an outlet 518 and a chamber 520 extending between the inlet 516 and the outlet 518 and placing the inlet 516 in fluidic communication with the outlet 518.

The inlet 516 is placed in fluidic communication with an incompressible liquid source 522, for example a water reservoir, via injection means 524 adapted for transferring the liquid from the liquid source 522 to the inlet 516, and appropriate tubing extending between the inlet 516, the injection means 524 and the liquid source.

According to a preferred embodiment, the injection means 524 are formed by a pump, as will be described later. However, the injection means could also be formed by a conventional piston or by other appropriate means.

The outlet 518 is adapted to be placed in liquid tight fluidic communication with the opening 514 formed by the neck 512 of the preform 502, and therefore with the inner volume 510 of the preform 502. By liquid tight fluidic communication, it is meant that when the outlet 518 is in fluidic communication with the inner volume of the preform 502, the liquid flows only in the inner volume 510 of the preform 502 and not outside the preform 502.

The outlet 518 is for example formed by an opening of an injection nozzle 526. The outlet 518 is in fluidic communication with the chamber 520. The injection nozzle 526 is movable inside a housing 525 of the injection device 504, in translation along axis A between a retracted position (FIGS. 6 and 15) and an active position (FIGS. 7 to 14 and 17). In the retracted position, the injection nozzle 526 leaves room under the injection device 1 to position a preform 502 under the injection nozzle 526, as shown in FIG. 6. In the active position, the injection nozzle 526 is placed against the neck 512 of the preform 502 with a liquid tight contact between the injection nozzle 526 and the neck 512 of the preform 502, such that the outlet 518 of the injection nozzle 526 is in fluidic communication with the inner volume 510 of the preform 502.

The chamber 520 of the injection nozzle 526 for example comprises a hollow space including a regular cylindrical portion and a truncated cone or a pyramidal portion extending between the regular cylindrical portion and the outlet 518 of the injection nozzle. The diameter of the chamber 520 reduces progressively from the diameter of the regular cylindrical portion to the diameter of the opening in the conical portion.

The chamber 520 is in fluidic communication with the inlet 16 via a lateral opening 527 of the injection nozzle 526, and via a transversal duct of the housing 525.

The housing 525 further comprises a first upper compartment 528 arranged to receive actuation means 530 for moving the injection nozzle 526. The actuation means are for example pneumatic actuation means and for example comprise a piston, attached to the injection nozzle 526 and hermetically separating the first upper compartment 528 into an upper part and into a lower part, each able to be filled with air. For moving the injection nozzle 528 between its retracted position and its active position, air is injected in the upper part of the first upper compartment 528 in order to increase the pressure in said upper part and to move the piston 530 such that the volume of the upper part increases, while to volume of the lower part decreases. Conversely, for moving the injection nozzle 528 between its active position and its retracted position, air is injected in the lower part of the first upper compartment 528 in order to increase the pressure in said lower part and to move the piston 530 such that the volume of the lower part increases, while to volume of the upper part decreases. The inner volume of the chamber 520 is hermetically isolated from the first upper compartment 528 by appropriate sealing means 531.

The injection device 504 further comprises a hollow control rod 532 extending in the chamber 520 along axis A. The hollow control rod 532 comprises at its lower end, extending in the chamber 520, a sealing ring 534. The sealing ring 534 has a shape which is complementary to the shape of part of the conical portion of the injection nozzle 526, such that, when the sealing ring 534 is applied against the wall of the conical portion, the sealing ring 534 closes hermetically the chamber 520 and prevents liquid from flowing through the outlet 518. The hollow control rod 532 is movable in translation along axis A in the chamber 520 between an injecting position, shown in FIGS. 8 to 10, wherein the sealing ring 534 is spaced from the wall of the pyramidal portion of the injection nozzle and wherein the outlet 518 is in fluidic communication with the inlet 16 via the chamber 520, and a sealing position, shown in FIGS. 6, 7 and 11 to 15, wherein the sealing ring 534 is applied against the wall of the conical portion of the injection nozzle 526 and hermetically closes the chamber 520.

The housing 525 further comprises a second upper compartment 536 arranged to receive actuation means for moving the control rod 532. The actuation means are for example pneumatic actuation means and for example comprise a piston 538, attached to the control rod 532 and hermetically separating the second upper compartment 536 into an upper part and into a lower part, each able to be filled with air. For moving the control rod 532 between its injecting position and its sealing position, air is injected in the upper part of the second upper compartment 536 in order to increase the pressure in said upper part and to move the piston 538 such that the volume of the upper part increases, while to volume of the lower part decreases. Conversely, for moving the control rod 532 between its sealing position and its injecting position, air is injected in the lower part of the second upper compartment 536 in order to increase the pressure in said lower part and to move the piston 538 such that the volume of the lower part increases, while to volume of the upper part decreases. The first upper compartment 528 is hermetically isolated from the second upper compartment 536 by appropriate sealing means.

A stretch rod 540 extends inside the hollow control rod 532, passes through the outlet 518 and extends in the preform 502 to assist in the deformation of the preform 502 into a container, as known per se. The stretch rod 540 is formed by a rigid solid rod, meaning that no fluid is able to flow through the stretch rod 540. The stretch rod 540 is movable in translation along axis A in the hollow control rod 532 and is actuated by appropriate actuation means 541, for example a servo motor or a magnetic actuation means. The functioning of the stretch rod 540 will be described with the description of the method according to the invention. Sealing means 543 are provided between the stretch rod 540 and the seal pin 534 in order to prevent liquid from flowing between the stretch rod and the seal ring 534.

In the vicinity of the seal ring 534, the hollow control rod 532 therefore defines a port extending around the stretch rod 540 and through which the stretch rod 540 is movable in a fluid tight manner thanks to the sealing means 543.

The mold 506 for receiving the preform 502 comprises a molding cavity 542 having the shape of the container 501 to be produced. The mold comprises for example at least two parts movable relative to each other, between an opened position and a closed position. The two parts are for example hinged together and are movable in rotation relative to each other around an axis substantially parallel to the axis A of the preform 502. Each part of the mold 506 comprises a body comprising a hollow recess having the shape of a half bottle to be formed.

According to a non-limiting example, the hollow recess of one part comprises a semi-cylindrical portion, closed at its lower end by a bottom surface having a the shape of a semi-circle, and terminated at its upper end by a tapered, then semi-cylindrical collar of a shape substantially complementary to the shape of half of the body 508 of the preform 502. The hollow recess of the other part of the mold is symmetrical to the hollow recess described above. In the opened position, the parts of the mold are separated from each other such that the preform 502 can be introduced between the two parts. In the closed position, the two parts are applied against each other to form a main part, such that the hollow recesses face each other and define together the molding cavity 542 having the shape of the container 501 to be formed. The molding cavity therefore comprises a cylindrical portion 544, extending according to axis A, defined by the semi-cylindrical portions of the recesses and intended to form the body of the container 501, closed at its lower end by a circular bottom surface 546, formed by the bottom surfaces of the recesses and intended to form the bottom of the container, and terminated at its upper end by a collar 548, substantially complementary to part of the body of the preform 2. When the mold is closed, the preform 502 is held in the molding cavity by the collar 548 of the molding cavity. The collar holds the preform 502 just below the neck 512 of the preform, which extends above the collar 548 of the molding cavity outside of said cavity. The molding cavity is hermetically closed with the preform 2 extending inside the molding cavity.

Figure 8:
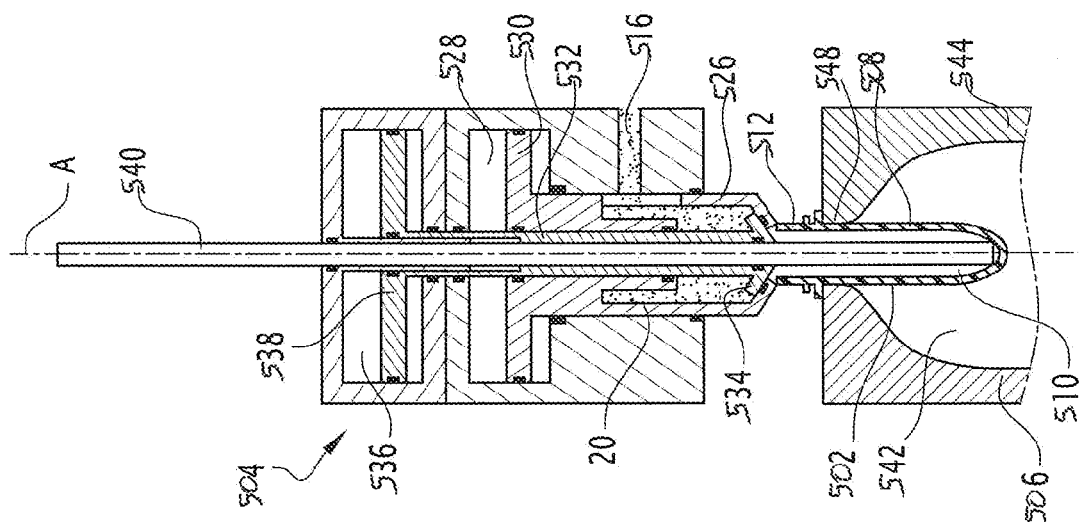

According to the embodiment shown in FIGS. 8 and 14, the mold 506 further comprises a bottom part 550, movable in translation relative to the main part along axis A between an inactive position (FIG. 8) and an active position (FIG. 14). In the inactive position, the bottom part 550 extends below the main part and defines, with the main part, a molding cavity having a first volume. In the active position, the bottom part 550 extends in the main part and defines, with the main part, a molding cavity having a second volume, which is inferior to the first volume. The bottom part 550 may have a particular shaping surface 552, intended to confer to the bottom of the container to be formed a particular shaped bottom 554, as shown in FIG. 15, and known as a "stoke base".

The method for producing a container 1 from a preform 2, using an injection device 504 and a mold 506 as described above will now be described, first according to a first embodiment in reference to FIGS. 6 to 12 and 16 and then according to a second embodiment in reference to FIGS. 13 to 15.

Figure 16:
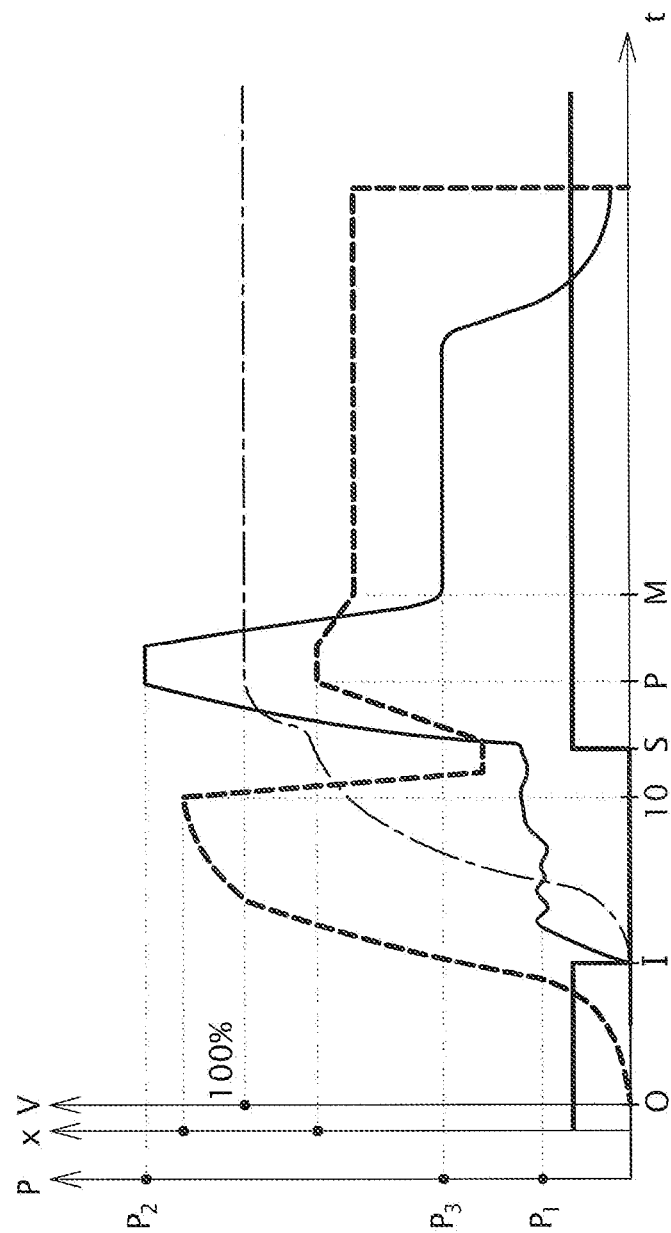
FIG. 16 is a diagram showing the relation between the deformation of the preform and the pressure profile applied to the preform.

FIG. 16 is a diagram wherein the continuous line represents the pressure of the liquid ("P" vertical axis) over time (horizontal axis). The bold dotted line represents the movement of the stretch rod over time ("x" vertical axis). The mixed line represents the volume ("V" vertical axis) of the deformed preform over time. The bold continuous line represents the movement ("x" vertical axis) of the seal pin 534 over time.

In a first step, the preform 502 is pre-heated, for example in an oven (not shown), up to a temperature compatible with the subsequent deformation of the preform into a container. The preform is for heated to a temperature greater than the glass transition temperature of the preform material. Such an oven and heating step are conventional in methods and machines for producing containers and will not be described in greater detail here.

Figure 6:
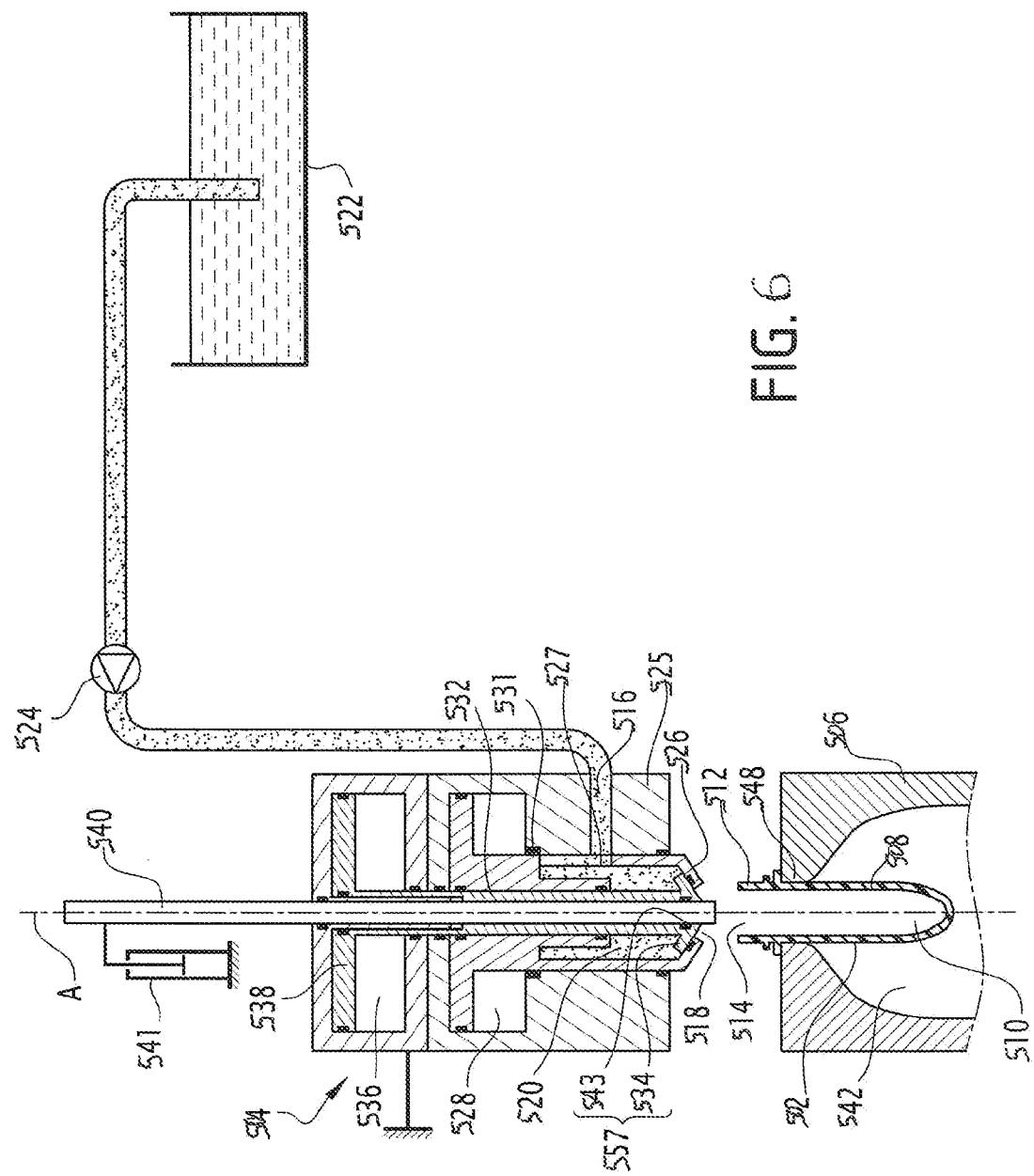

The preform 502 is then loaded into the mold 506 and placed under the injection device 504, as shown in FIG. 6. The injection nozzle 526 is, at this stage, in its retracted position while the control rod 532 is in its sealing position, as shown by the first segment of the bold continuous line of FIG. 16. The stretch rod 540 is also in a retracted position, wherein it barely protrudes from the outlet 518 or wherein it is completely retracted in the control rod 532, in order to leave a space under the injection device 501 to place the preform 502 loaded into the mold 506, as shown in FIG. 6. The inner volume of the chamber 520 is already filled with the incompressible liquid coming from the liquid source 522 and injected through the inlet 516 by the injection means 524. The injection means 524 are set to inject the liquid at a first pressure P1, which is for example comprised between 504 and 15 bars depending on the size and volume of the container to be produced.

Figure 7:
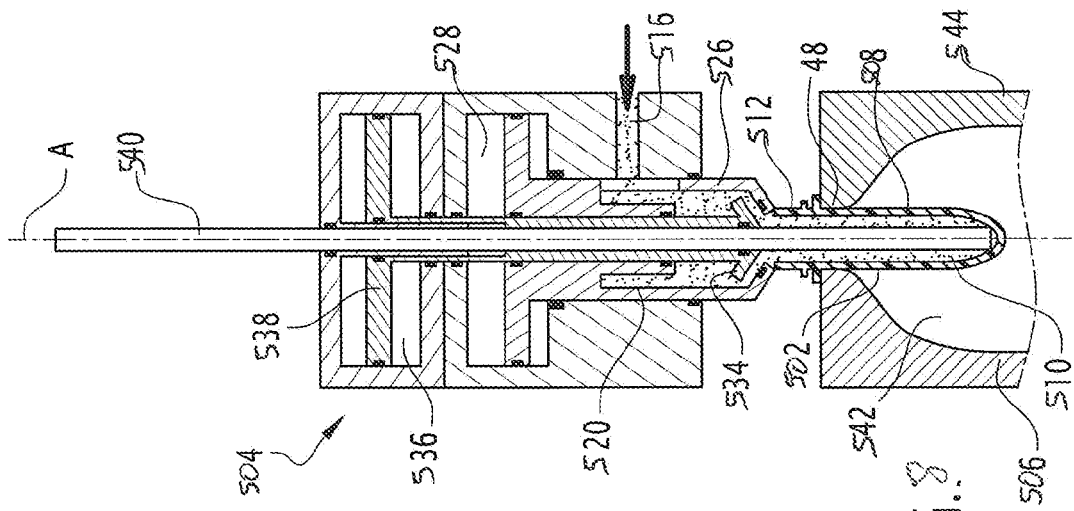

Next, as shown in FIG. 7, the injection nozzle 526 is moved into its active position wherein the outlet 18 is placed in abutment against the neck 512. The stretch rod 540 is moved in translation along axis A until it reaches the bottom of the preform 502, as shown in FIG. 7. At this stage, the control rod 532 is still in its sealing position. This step, wherein the stretch rod 540 is placed against the bottom of the preform and wherein the deformation of the preform has not begun is known as "point 0" of the hydro forming method, designated by reference 0 in the time axis of FIG. 16.

As shown in FIG. 8, the control rod 532 is then moved into its injecting position, as shown by reference I and by the second segment of the bold continuous line in FIG. 16, thereby placing the inlet 516 in fluidic communication with the outlet 518, and hence with the inner volume 510 of the preform. The preform 502 is then filled with the liquid which is injected through the outlet 518 at the first pressure P1. The injection of the liquid in the preform 502 causes the preform 502 to deform, the wall of the body 508 being expanded towards the wall of the molding cavity 542 and the volume of the deformed preform increasing progressively as shown by the mixed line of FIG. 16. This deformation is assisted by the stretch rod 540 which continues to be moved in translation along axis A towards the bottom of the mold 506 so as to cause an axial deformation of the preform 502, as shown in FIGS. 8 and 9. It should be noted that during the movement of the control rod 532, small variations in the pressure can occur as the preform volume increases to become a partially formed container, as shown by the continuous line shown in FIG. 16 after reference I.

When the stretch rod 540 reaches the bottom of the mold 506 (FIG. 9), the movement of the stretch rod is stopped and a reverse movement is begun in order to retrieve a part of the stretch rod 540 from the deformed preform 502 (FIG. 10). The step wherein the stretch rod 540 reaches the bottom of the mold 506 and is stopped is known as "point 10" of the hydro forming method. At point 10, designated by reference 510 in the time axis of FIG. 16, the preform 502 has for example been deformed at more than 50% of the final shape of the container, meaning that the volume of the deformed preform 502 has reach more than 50% of the volume of the container 501 to be produced.

When the liquid has filled the deformed preform 502 up to a predetermined limit and when a part of the stretch rod has been retrieved from the bottom of the deformed preform 502, the preform has acquired an intermediary shape 556, which is not quite the shape of the container to be produced, as shown in FIG. 11. The control rod 532 is moved in its sealing position to stop the injection of liquid inside the deformed preform 502, as shown in FIG. 11 and as designated by reference S and shown by the third segment of the bold continuous line in FIG. 16. The intermediary shape 556 presents a volume, which is substantially comprises between 95% and 99% of the volume of the container 501 to be produced, meaning that the deformed preform has to be further deformed such that the volume increases by 1% to 5% for the container to be obtained.

Until the control rod 532 is moved in its sealing position, the liquid continuously fills in a volume 510 of the deformed perform, and fills the chamber 520, up to the injection means 524. When the control rod 532 is in its sealing position, a sealing barrier 557 isolates a closed volume 558 of liquid from the rest of the chamber 520. The sealing barrier 557 consists in the sealing between the seal ring 534 and the conical portion of the chamber 520 and by the sealing means 543 between the seal ring 534 and the stretch rod 540 and by a section of the stretch rod itself which closes the port defined by the hollow control rod 532. The closed volume 558 is delimited by almost rigid spare parts of the injection device such that when the volume of the stretch rod being inside the closed volume 558 increases, the liquid pressure and the force applied to the preform wall also increase. As the mechanical resistance of the preform material is far less than that of said spare parts, the preform wall is deformed. The sealing barrier 557 extends between the outlet 18 and the injection means 24 arranged to pressurize the liquid at the first pressure P1.

In other words, the sealing barrier 557 is formed by the sealing between the seal ring 534 and the conical portion of the chamber 520 and by the sealing means 543 between the seal ring 534 and the stretch rod 540 and comprises a port through which the stretch rod 540 is movable in a fluid tight manner. The closed volume 558 is closed by the sealing barrier 557 and by the stretch rod 540 extending through the port.

The stretch rod 540 passes through the sealing barrier 557, i.e. through the port defined by the hollow control rod 532 in the vicinity of the seal ring 534. It moves hermetically across the sealing barrier 557, meaning that the stretch rod 540 is able to move in the closed volume 558 without breaking the sealing barrier 557. This can be achieved by providing appropriate sealing means 543 between the seal pin 534 and the stretch rod 540. In particular, the sealing means 543 are adapted to allow a downward as well as an upward movement of the stretch rod 540 is the closed volume without allowing the liquid from to closed volume to leave said closed volume. A part of the stretch rod 40 is inside the closed volume and occupies a small portion of that closed volume. The remaining portion of the closed volume is totally filled with liquid. The sealing barrier is located inside the injection nozzle 526 and extends over the opening 514 of the neck 512, over the inner volume 510 of the deformed perform.

At this stage (shown in FIG. 12), the stretch rod 540 is moved back into the inner volume of the deformed preform 2. The volume of the stretch rod 540 in the closed volume therefore increases and pushes the liquid. The pressure inside the closed volume increases. The increase in pressure is very rapid until a second pressure P2 is applied inside the preform, as shown by references P and P2 in FIG. 16. The effect of the range of pressures between first pressure P1 and second pressure P2 and of the second pressure P2 is to further deform the deformed preform 502 from its intermediary shape to the shape of the container to be produced, when the wall of the deformed preform is completely applied against the wall of the molding cavity 542, as shown in FIG. 12. The second pressure P2 is for example comprised between 20 and 80 bar. When the preform material is PET, the second pressure P2 can be comprised between 20 and 50 bar, in particular between 35 and 40 bars. When the preform material is metallic, the second pressure P2 could be higher than 40 bars.

The volume of the stretch rod 540 which is inserted inside the deformed preform 502 while the closed volume is closed corresponds to the difference of the volume between the final formed container 501 and the intermediary shape 556. The value of the second pressure P2 is advantageously controlled by controlling the force applied to the stretch rod 540 towards the bottom of the mold 6 while the closed volume remains tightly closed. When the container is almost totally urged against the mold cavity 542, the volume of the stretch rod inside said inner volume may have very little variation while the value of the second pressure P2 can increase significantly. When the container cannot expand any more, the stretch rod cannot move.

Controlling the force applied on the stretch rod makes it simple to control the applied pressure. The station may comprise a control unit (not shown) including a memory which stores time profile data corresponding to the force to be applied by the piston member. Alternatively, the control unit may include determination means of such as time profile of the force to be applied. The station may further comprise a sensor sensing a technical parameter correlated to the force really applied by the piston member. The sensor may be a liquid pressure sensor or a current sensor of feeding electrical current of a driver of the piston member. The control unit may include one or several regulation loops connected to one or several of these sensors.

The control unit is adapted to successively drive the injection means 524, close the sealing barrier 557 when the volume 558 to be formed is full of liquid and then to drive the piston member 540 so as to increase the liquid pressure in the closed volume 558. The control unit could be adapted to drive successively the above three items by being connected to appropriate sensors, or determination means, providing the control unit with the information that the status expected from one of these items (injection means, sealing barrier, or piston member) is now completed (the volume to be formed is now full of liquid or the sealing barrier is now closed), and that the control unit is now allowed to drive the next item. The control unit could be so adapted by including an appropriate software or the like.

Then, a maintaining step can advantageously take place (point M of the time axis of FIG. 16). As the material of the perform has reached very quickly the final shape of the container 1 (in less than 0.2 s for example), the temperature of that material may still be too hot, it could still be rather viscous and not stabilized in shape. A pressure needs to be continuously applied while the preform material cools down to an almost crystallized state. The "maintaining step" could also be called a "holding step" or a "container shape keeping step". The pressure applied to keep the shape of the container could be called the holding pressure, or third pressure P3. The holding step is often necessary, even if the mold, against which the material is urged, is at ambient temperature, and if the liquid filling the formed container is cold, for example around 10° C. The holding step is even more necessary when the forming medium is hot, for aseptic reason for example.

The holding pressure applied during the maintaining step could be lower than the peak pressure P2, because the volume expansion shows some hysteresis phenomenon when the pressure decreases. The friction of the thermoplastic material against the mold cavity keeps the container in place, even with a lower maintaining pressure.

Once the preform has acquired its final shape of the container 1 to be produced, and once the container material temperature is reduced such that a crystallisation has occurred, the force applied to the stretch rod 540 may stop. The liquid pressure drops down to the atmospheric pressure. The container is now ready to be opened. The stretch rod 40 is retrieved from the inner volume and the injection nozzle 526 is moved back into its retracted position. The mold 506 is moved from under the injection device and the filled container can be removed from the mold 506. The length of the stretch rod remaining into the inner volume while the relative pressure of the liquid is substantially null, corresponds to the volume of liquid extending between the sealing barrier 557 and the desired free level 559 of the liquid into the opened filled container 501 (FIG. 15).

Another advantage of the invention is that the strength necessary to close the seal pin 534 is minimized, because the seal pin 534 is closed only when the first pressure P1 is applied, before the increase of the pressure up to the second pressure P2. Therefore, the response time of the seal pin closing sequence is significantly improved. As soon as the seal pin 534 is closed, the pressure increase sequence can start while, in parallel of the pressure increase, actuation of a locking mechanism can hold the seal pin 534 in the closed position.

According to the second embodiment of the invention, the second pressure P2 can be applied both by inserting the stretch rod 540 inside the deformed preform and by reducing the volume of the molding cavity 542, for example by moving a bottom part of the mold as disclosed in WO-2012/037054. This allows reducing the amplitude of the movement of both the stretch rod and the bottom part of the mold to apply the second pressure, compared to a method wherein the second pressure is applied only by the stretch rod or only by the volume reduction of the mold. For example, the volume of the molding cavity can be reduced by 0.1% to 5% to increase the pressure applied to the deformed preform, the rest of the pressure needed to reach the second pressure P2 being obtained by moving the stretch rod inside the deformed preform.

As shown in FIGS. 13 to 15, the stretch rod 540 can also be used to control the pressure inside the container while a particular bottom 554, or stoke base, is formed. For forming the particular bottom, a bottom part 552 of the mold 506 is moved inside the molding cavity 542 to impart the shape of the bottom part 552 on the bottom of the container, as shown in FIG. 14. This movement causes the volume of the molding cavity 542 to be reduced and hence the pressure applied to the container to increase. This increase in pressure is therefore compensated by a corresponding retracting of the stretch rod 540, as shown in FIG. 14. Consequently, a container having a stoke base can be easily obtained as shown in FIG. 15.

The movement of the bottom part 552 for forming the stoke base can advantageously be actuated by a servo motor. This allows controlling the force applied by the bottom part, or controlling the movement amplitude, or controlling a combination thereof. As for the control of the stretch rod movement, the preferred parameter used to control the movement may change along sequences of the method.

It is to be understood that this particular feature could be used to impart a particular shape on any part of the body of the container, for example for forming a grip around the body. Any increase in pressure implied by imparting the particular shape can be compensated by a corresponding movement of the stretch rod 540.

In the embodiments described above, the stretch rod 540 is used as a piston member introduced in the closed volume to increase the pressure in said volume. However, according to a third embodiment, shown in FIG. 17, the piston member and the stretch part can be distinct parts, as will now be described.

Figure 17:
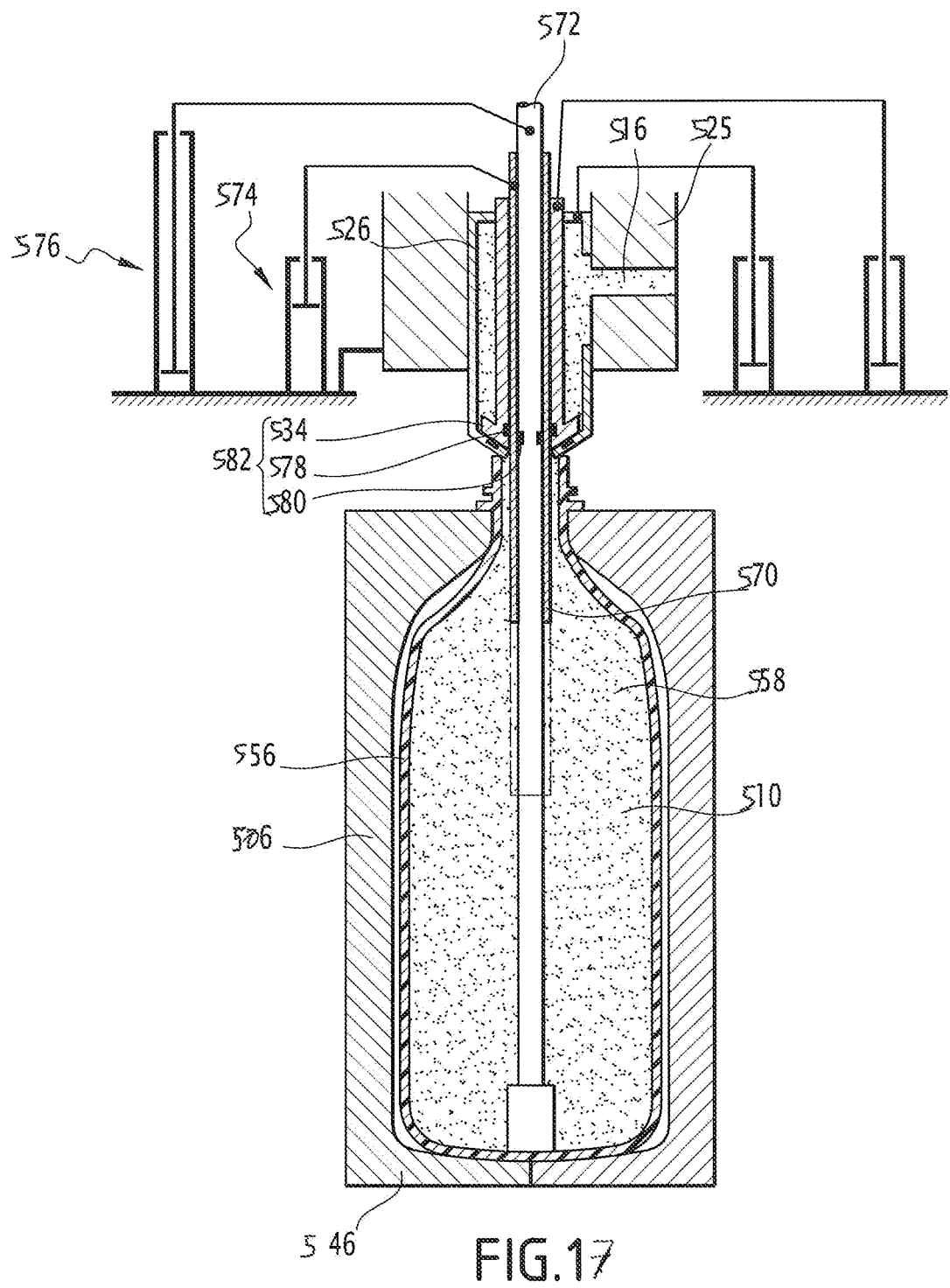
FIG. 17 is a diagrammatical cross-section view of an injection device according to a third embodiment of the invention, wherein the piston member is distinct from the stretch rod.

As illustrated in FIG. 17, the third embodiment differs from the first embodiment by the fact that it comprises a piston member 570 and a stretch rod 572 which are distinct from each other, and respectively actuated by a piston actuator 574 and by a stretching actuator 576. As illustrated, the piston member 570 may be a tube, coaxial to the stretch rod 572, while the stretch rod 572 remains a rigid solid rod, meaning that no fluid is able to flow through the stretch rod 572. The third embodiment comprises a sealing element 578 which seals the space between the piston member 570 and the seal ring 534. The port defined by the hollow control rod 532 therefore extends around the piston member 570. It also comprises a sealing element 580 providing sealing between the piston member 570 and the stretch rod 572. Therefore, when the seal ring 534 presses the injection nozzle 526, this closes a sealing barrier 582. The sealing barrier 582 consists in the seal ring 534, the sealing element 578, a portion of the piston member 570, the sealing element 580 and a portion of the stretch rod 572. Therefore, both the piston member 570 and the stretch rod 572 hermetically pass through the sealing barrier 582 towards the inner volume 510 by passing through the port defined by the hollow control rod.

In other words, the sealing barrier 582 consists in the seal ring 354 and the sealing element 578 and comprises a port through which the piston member 570 and the stretch rod 572 are movable in a fluid tight manner. The closed volume 58 is closed by the sealing barrier 582 and by the piston member 570, the sealing element 580 and the stretch rod 572.

In a variant, the piston member 570 could have any shape compatible with the opening of the container to be formed and filled, said shape being adapted to preserve the sealing barrier 582 when the closed volume is formed by the sealing barrier 582.

In another variant, the forming and filling station may have longitudinal stretching means which does not include any internal stretch rod. Therefore, the piston member 570 may be actuated to only increase or control the pressure of the liquid in a prefilled and deformed perform (or in the almost completed container). During this step, the piston member 570 enters into the deformed perform but does not touch the bottom of the preform until the perform bottom touches the mold base 546.

It is to be understood that the third embodiment could also be combined with the second embodiment, by using a piston member 570 is conjunction with a movable bottom part 552.

An advantage of the third embodiment and of its variants is that the piston member 570 could be positioned in a retracted position while the stretch rod 572 or any corresponding stretching means continues to longitudinally stretch the perform. This allows a better synchronization of the increases in pressure versus the end of axial stretching. In some application, the increase in pressure could even start before the end of the axial stretching. In other applications, the method could include a shape developing step occurring after the end of the axial stretching and before the final increase in pressure due to the action of the piston member 570. During that shape developing step, the filled volume increases due to natural expansion of the perform material urged by the first pressure P1.

The station described above is for example used in a machine for forming and filling with liquid a plurality of containers. Such a machine comprises a plurality of stations distributed along a closed loop carousel. The stations can be fed with the liquid from a single liquid source connected to a single pump. The pump is connected to the injection devices of each station. Such a machine requires less space to be installed.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method of forming a plastic container from a preform, said method comprising:
    heating a preform;
    inserting said preform within a mold cavity;
    introducing a pressurized liquid into said preform to expand said preform to closely conform to said mold cavity; and
    actuating a stretch initiation rod system to engage an interior portion of said preform and actuating said stretch initiation rod system following at least a portion of said introducing said pressurized liquid to create a pressure spike within the container.

2. The method according to claim 1, wherein the method further comprises placing the preform in a mold having said mold cavity, said mold cavity having the shape of the container to be produced, the preform placed in the mold being made of a thermoplastic material and being heated to a temperature greater than the glass transition temperature of the preform material prior to the liquid injection in the preform.

3. A method for producing a container filled with a liquid from a preform having an inner volume, the method using an injection device comprising an inlet in fluidic communication with a source of the liquid, an outlet, and a chamber extending between the inlet and the outlet, the injection device further comprises a hollow control rod with a sealing ring extending in the chamber and arranged to close the outlet, the method comprising the steps of:
    placing the outlet in tight fluidic communication with the preform;
    injection the liquid from the source in the inner volume of the preform through the outlet;
    closing a sealing barrier between the inner volume and the liquid source, the closed sealing barrier forming a fluid tight closed volume, said closed volume including at least the inner volume, and wherein said closing of the sealing barrier takes place once the closed volume is full of liquid, said closing the sealing barrier being made by moving the hollow control rod
        from an injecting position wherein the outlet is in fluidic communication with the inlet chamber,
        to a sealing position wherein the sealing ring closes the chamber such that the sealing barrier isolates the closed volume from the rest of the chamber,
    placing a piston member in said closed volume, the piston member extending inside the hollow control rod, a sealing element between the piston member and the sealing ring forming a liquid tight engagement between the piston member and the sealing ring; and
    driving said piston member when the sealing barrier is closed such that the liquid pressure in the closed volume increases,
    wherein during the actuation of the piston member, the piston member enters at least in part inside the inner volume of the preform.

4. The method according to claim 3, wherein the piston member is a stretch rod moved inside the inner volume of the preform in order to cause a deformation of the preform.

5. The method according to claim 4, wherein during the injection of the liquid, the method comprises the steps of:
    moving the stretch rod in translation along an axis A, defining an axial direction to a bottom of the preform,
    pushing the stretch rod to axially deform the preform, and
    retrieving at least a part of the stretch rod from the inner volume before the closing of the sealing barrier.

6. The method according to claim 3, wherein the method further comprises placing the preform in a mold, said mold forming a mold cavity having the shape of the container to be produced, the preform placed in the mold being made of a thermoplastic material and being heated to a temperature greater than the glass transition temperature of the preform material prior to the liquid injection in the preform.

7. The method according to claim 6, wherein the injection of the liquid is a primary deformation step, said liquid being injected at a first pressure (P1) arranged to cause a deformation of the preform towards the wall of the mold cavity and the closing of the sealing barrier takes place when said deformed preform has acquired an intermediary shape.

8. The method according to claim 7, wherein the first pressure (P1) is applied to the liquid by injection means adapted for transferring the liquid from the liquid source to the injection device, the sealing barrier extending between said injection means and the outlet of the injection device.

9. The method according to claim 3, wherein the actuation of said piston member is made by increasing the volume of the piston member inside the closed volume, the other parts delimiting said closed volume being the preform itself and almost rigid parts fixed with respect to the preform.

10. The method according to claim 7, wherein the actuation of the piston member applies a second pressure (P2) inside the inner volume, said pressure being arranged to further deform the preform from its intermediary shape to the shape of the molding cavity such that a filled and formed container is obtained.

11. The method according to claim 10, wherein the first pressure (P1) is applied until the intermediary shape presents a volume corresponding to between 95% and 98% of the volume of the container to be produced, the second pressure (P2) being applied such that the volume of the intermediary shape further increases by 2% to 5% in order to obtain the formed container.

12. The method according to claim 6, comprising a holding step during which the deformed preform shape is upheld at the shape of the mold cavity, a force applied to the piston member being controlled such that the pressure applied to the liquid in the closed volume follows a predetermined pressure profile (P3).

13. The method according to claim 10, wherein the second pressure (P2) is applied both by moving the piston member inside the closed and filled volume of the deformed preform and by reducing the volume of the molding cavity.

14. The method according to claim 6, wherein the mold comprises at least one main part and one bottom part, said parts defining together the molding cavity, the reducing of the volume of the molding cavity being obtained by moving the bottom part relative to the main part of the mold.

15. The method according to claim 6, wherein the method comprises a step of shaping at least part of the container by further reducing the volume of the molding cavity, the pressure applied to the deformed preform during this step being maintained at a constant level by retrieving a part of the piston member form the inner volume to compensate for the increase in pressure due to reduction of the volume of the molding cavity.

16. The method according to claim 7, wherein the first pressure (P1) is substantially between 4 and 15 bar.

17. The method according to claim 10, wherein the second pressure is substantially between 20 and 80 bar.

18. The method according to claim 10, wherein the second pressure is between 25 and 45 bars.

19. the method according to claim 12, wherein the pressure of the predetermined pressure profile is between 4 to 20 bars.

20. The method according to any one of claims 3, wherein the position of the piston member inside the formed container just before the outlet and the piston member are retrieved from the formed container is such that the volume of the liquid inside of the closed volume is equal to a volume of liquid at or below a desired level of liquid inside the produced container.

21. A method for producing a container filled with a liquid from a preform having an inner volume, the method using an injection device comprising an outlet and connected to the source of the liquid, the method comprising the steps of:
  placing the outlet in tight fluidic communication with the preform;
  injection the liquid from the source in the inner volume of the preform through the outlet;
  closing a rigid sealing barrier in the vicinity of the outlet between the inner volume and the liquid source, said sealing barrier comprising a port allowing a movement in a fluid tight manner of a piston member through the port, said rigid sealing barrier and said piston member forming a fluid tight closed volume, said closed volume including at least the inner volume, said closing of the sealing barrier taking place once the closed volume is full of liquid; and
  increasing the pressure of the liquid in the closed volume by moving the piston member though the port in the closed volume when the sealing barrier is closed,
  wherein during the actuation of the piston member, the piston member enters at least in part inside the inner volume of the preform.

* * * * *